United States Patent
Suenderhauf et al.

(10) Patent No.: US 7,693,868 B2
(45) Date of Patent: Apr. 6, 2010

(54) SEPARATION OF EMPLOYEE DATA FOR DIFFERENT APPLICATIONS

(75) Inventors: Philipp Suenderhauf, Leimen (DE);
Walter Koller, Bad Schonborn (DE);
Detlef Pluemper, Reichartshausen (DE);
Helgi Thorleifsson, Gaiberg (DE)

(73) Assignee: SAP AG, Walldorf (DE)

( * ) Notice: Subject to any disclaimer, the term of this patent is extended or adjusted under 35 U.S.C. 154(b) by 565 days.

(21) Appl. No.: 11/323,736

(22) Filed: Dec. 30, 2005

(65) Prior Publication Data

US 2007/0162495 A1    Jul. 12, 2007

(51) Int. Cl.
G06F 7/00 (2006.01)
(52) U.S. Cl. .................................................. 707/104.1
(58) Field of Classification Search ........................ None
See application file for complete search history.

(56) References Cited

U.S. PATENT DOCUMENTS

| | | | |
|---|---|---|---|
| 5,706,506 A | 1/1998 | Jensen et al. | |
| 5,946,489 A | 8/1999 | Yellin et al. | |
| 6,119,115 A | 9/2000 | Barr | |
| 7,120,664 B2 | 10/2006 | Sawa et al. | |
| 7,558,794 B2 | 7/2009 | Klein et al. | |
| 2003/0004967 A1* | 1/2003 | Calderaro et al. | 707/104.1 |
| 2003/0069839 A1 | 4/2003 | Whittington et al. | |
| 2003/0216957 A1 | 11/2003 | Florence et al. | |
| 2004/0186852 A1 | 9/2004 | Rosen | |
| 2004/0230914 A1* | 11/2004 | Arend et al. | 715/804 |

2007/0168395 A1    7/2007   Suenderhauf et al.

OTHER PUBLICATIONS

"U.S. Appl. No. 11/323,591—Final Office Action mailed Oct. 14, 2008", 14 pgs.
"U.S. Appl. No. 11/323,591—Non Final Office Action mailed Apr. 8, 2009", 18 pgs.
"U.S. Appl. No. 11/323,591—Non-Final Office Action mailed Mar. 31, 2008", 31 pgs.
"U.S. Appl. No. 11/323,591—Response filed Jan. 14, 2009 to Final Office Action mailed Oct. 14, 2008", 14 pgs.
"U.S. Appl. No. 11/323,591—Response filed Jun. 30, 2008 to Non Final Office Action mailed Mar. 31, 2008", 12 pgs.
"U.S. Appl. No. 11/323,591, Response to Non Final Office Action mailed Apr. 8, 2009", 12 pgs.
"U.S. Appl. No. 11/323,591, Final Office Action mailed Oct. 19, 2009", 19 Pgs.

* cited by examiner

*Primary Examiner*—Charles Rones
*Assistant Examiner*—Belix M Ortiz
(74) *Attorney, Agent, or Firm*—Schwegman, Lundberg & Woessner, P.A.

(57) ABSTRACT

The subject mater herein relates to human resources data processing and, more particularly, to separation of employee data for different applications, such as personnel administration applications. Various embodiments provide systems, software, and methods that maintain a first set of employee data in an employee object, wherein the first set of employee data is valid across one or more other objects, and executing a process of a business object requiring at least a portion of the first set of employee data. In some embodiments, the business object obtains the portion of the first set of employee data from the employee object and maintains a second set of employee data that is not valid across all other objects.

15 Claims, 7 Drawing Sheets

FIG. 2 FROM 060 CASE

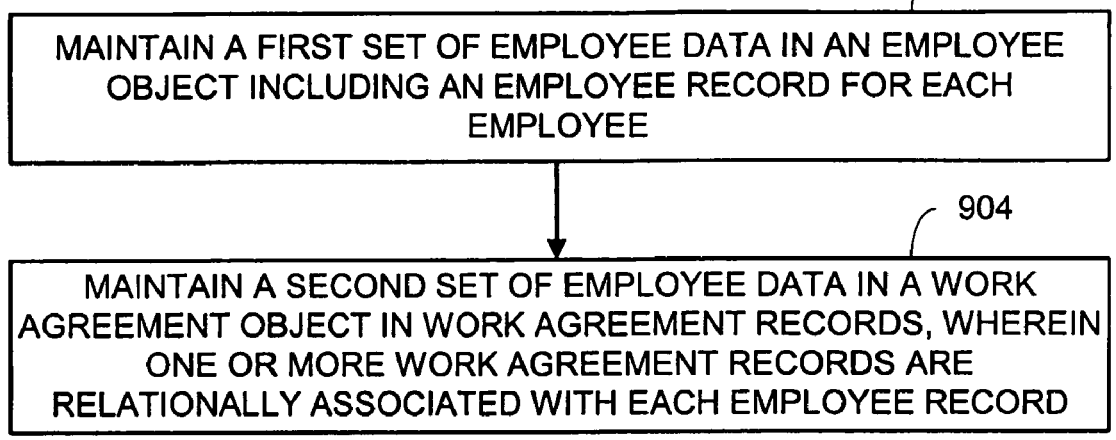
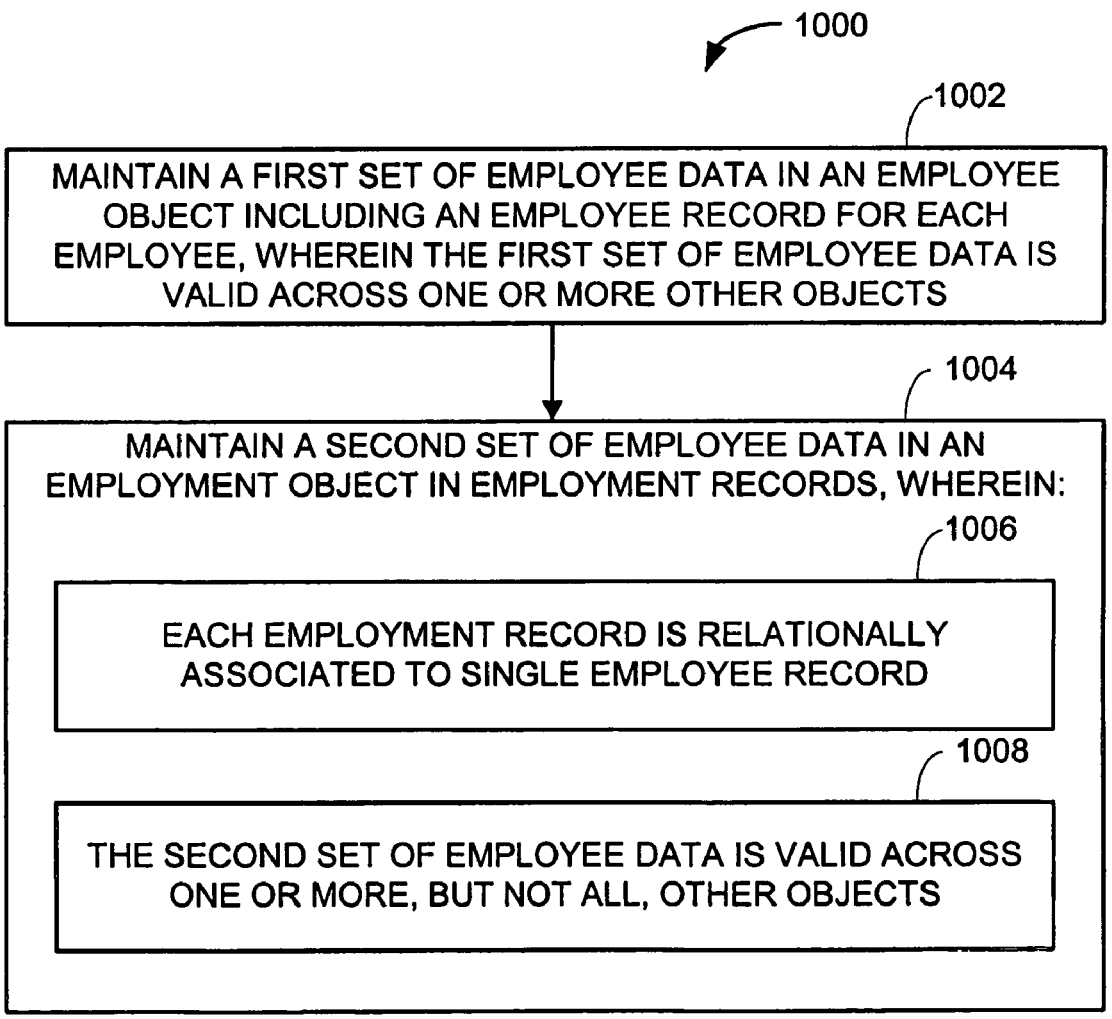

SEPARATION OF EMPLOYEE DATA FOR DIFFERENT APPLICATIONS

FIELD

The inventive subject mater relates to human resources data processing and, more particularly, to separation of employee data for different applications.

BACKGROUND

Human resource management systems maintain data related to employees. Such information includes information such as employee name, address, salary data, benefit data, vacation balances, tax data, and other data related to employment. This data is stored in databases having one record per employee.

However, storing employee data in a single record prevents human resource management systems from providing data access and processing flexibility. For example, if a payroll batch process is running, the payroll process locks all affected employee records until the payroll batch process is complete to prevent interim updates to the payroll data.

This lack of flexibility causes further issues. For example, if an employee, such as a teacher, has a work agreement covering a nine-month school year and another agreement covering a summer term, current human resource management systems do not provide a simple solution. A work around is used in some such systems by creating multiple employee records. However, this presents other issues such as maintaining redundant data between the two employee records that requires synchronization in the event of an update, such as an update to an employee's home address.

Another issue can arise in a situation where an employer has multiple business units, subsidiaries, or has operations in multiple taxing jurisdictions, such as countries. If an employee in such an organization is employed by more than one business unit, subsidiary, or in multiple taxing jurisdictions, present systems require multiple employee records, one for each business unit, subsidiary, or taxing jurisdiction.

BRIEF DESCRIPTION OF THE DRAWINGS

FIG. 9 is a flow diagram of a method according to an example embodiment.

FIG. 10 is a flow diagram of a method according to an example embodiment.

SUMMARY

The subject mater herein relates to human resources data processing and, more particularly, to separation of employee data for different applications, such as personnel administration applications. Various embodiments provide systems, software, and methods that maintain a first set of employee data in an employee object, wherein the first set of employee data is valid across one or more other objects, and executing a process of a business object requiring at least a portion of the first set of employee data. In some embodiments, the business object obtains the portion of the first set of employee data from the employee object and maintains a second set of employee data that is not valid across all other objects.

DETAILED DESCRIPTION

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural and logical changes can be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, such functions correspond to modules, which are software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
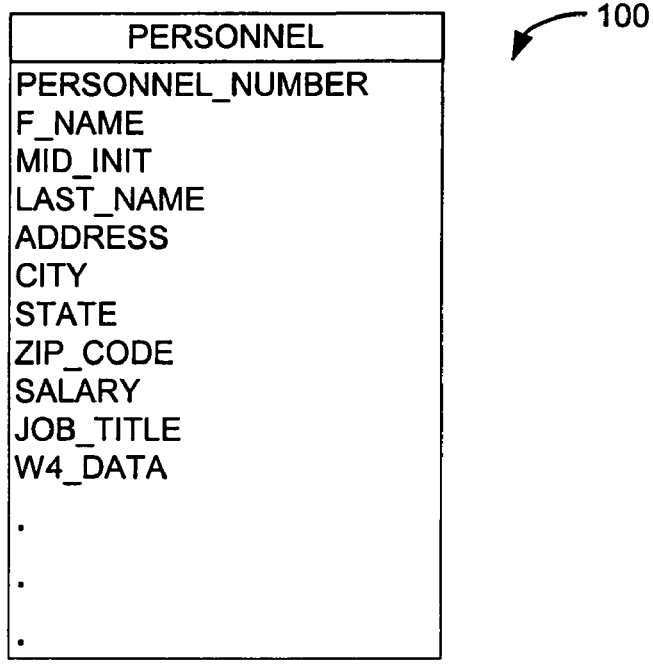
FIG. 1 is a data diagram of a personnel data structure according to an example embodiment.

FIG. 1 is a data diagram 100 of a personnel data structure according to an example embodiment. The data diagram 100 illustrates a PERSONNEL data structure, such as a PERSONNEL table. The PERSONNEL data structure includes a record for each employee. Each record has columns. The columns, with the column names corresponding to the data they hold, include:

PERSONNEL$_{13}$ NUMBER
F_NAME
MID_INIT
LAST_NAME
ADDRESS

CITY
STATE
ZIP_CODE
SALARY
JOB_TITLE
W4_DATA

The example PERSONNEL data structure of the data diagram 100 has limitations. For example, when an employee hold more than one job and when an employee has more than one pay rate. Another limitation is apparent when column of a PERSONNEL record needs to be updated while another process has the record locked. This can occur, for example, when a PERSONNEL record is locked while a payroll process is running. The payroll process requires data from the SALARY column and updates to that column cannot occur while the payroll process is executing. Thus, the PERSONNEL record is locked until the payroll process is complete. However, while the payroll process is executing, an employee or human resources representative may need to update an employee address in the ADDRESS column or other column not related to the payroll process. These limitations reduce the flexibility of systems including such PERSONNEL data structures.

Figure 2:
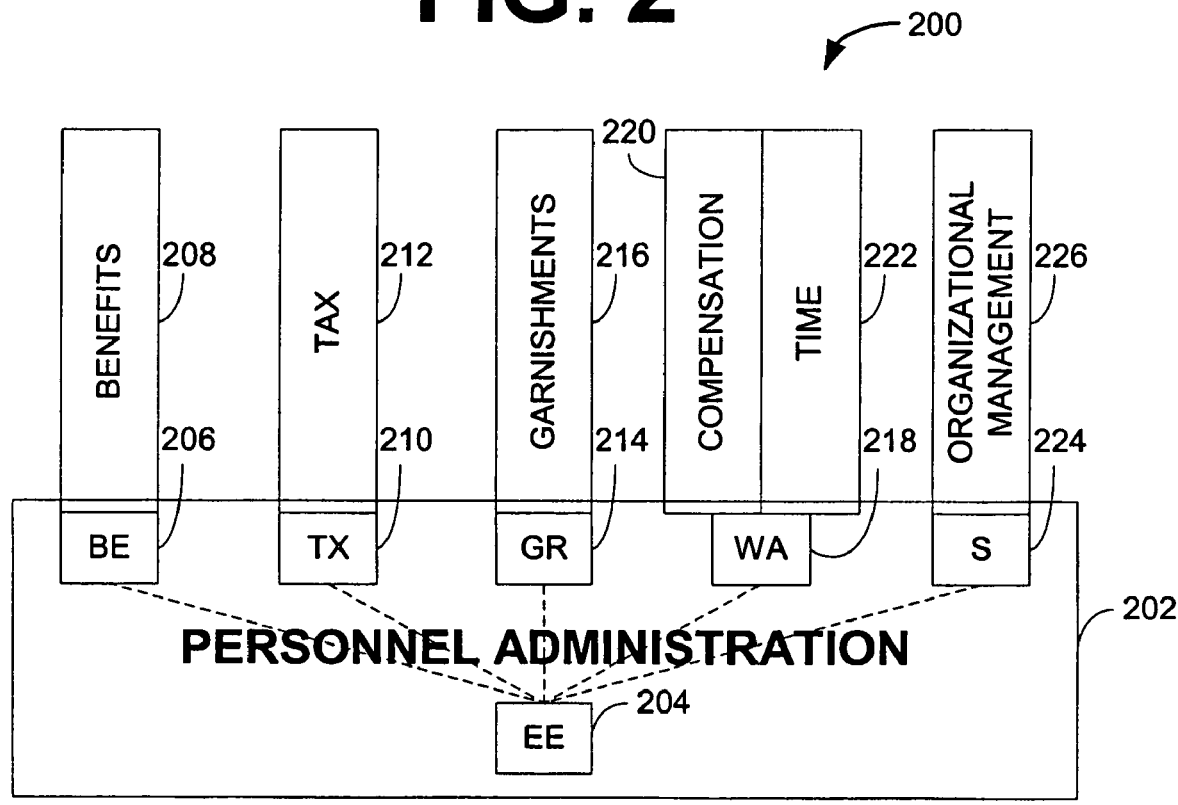
FIG. 2 is a block diagram of a system according to an example embodiment.

FIG. 2 is a block diagram of a system 200 according to an example embodiment. The example system 200 includes a personnel administration application 202. The personnel administration application 202 interfaces with other applications, such as applications benefits 208, tax 212, garnishments 216, compensation 220, Time 222, and organizational management 226. The personnel administration application interfaces with the applications through an employee object EE 204.

The employee object EE 204 includes data that describes individual employees. In various embodiments, employee objects include data of one or more of employees, contractors, temporary workers, or other categories of workers. The data of the employee object 204 is data that is valid across one or more other objects, such as objects BE 206, TX 210, GR 214, WA 218, and S 224. The employee object EE 204 further includes methods to obtain data from and provide data to other objects, such as objects BE 206, TX 210, GR 214, WA 218, and S 224. The exchange of data between these objects provides the interface between the applications 202, 208, 212, 216, 220, 222, and 226.

In some embodiments, each object EE 204, BE 206, TX 210, GR 214, WA 218, and S 224 maintains data for which it is responsible. For example, the employee object EE 204 maintains employee data, the benefits object BE 206 maintains benefits data, the tax object TX 210 maintains tax data, the garnishments object GR maintains payroll garnishments data, the work agreement object WA 218 maintains work agreement data such as compensation data and time data, and the organizational management object S 224 maintains organizational management data. In some embodiments, the data of these objects is not valid across all other objects BE 206, TX 210, GR 214, WA 218, and S 224.

In some embodiments, the objects EE 204, BE 206, TX 210, GR 214, WA 218, and S 224 are the sole proprietors of the data that they maintain. In such embodiments, all data create, read, update, and delete actions can only be performed by the proprietor object of the data. In such embodiments, the objects EE 204, BE 206, TX 210, GR 214, WA 218, and S 224 include methods to provide create, read, update, and delete action capabilities to other objects, but the proprietor object of the data performs the methods and provides a return to the object calling the action method.

In some embodiments, the data the objects EE 204, BE 206, TX 210, GR 214, WA 218, and S 224 maintain is stored in a database, such as a relational database. In other embodiments, the data is store in files or other data structures.

In some embodiments, the applications 208, 212, 216, 222, and 226 include processes that require employee data from the personnel administration application 202. The applications 208, 212, 216, 220, 222, and 226 obtain the data from the personnel administration application 202 from there respective objects BE 206, TX 210, GR 214, WA 218, and S 224. These objects BE 206, TX 210, GR 214, WA 218, and S 224 in turn obtain the personnel administration data from the employee object EE 204.

A benefit of the architecture of the system 200 is that when a payroll process of the compensation application 220 is executing and must lock payroll related data, non-payroll data is available for other needed actions within the system while the payroll process executes. There are numerous other benefits of this architecture where the employee object EE 204 data is separated from other application data.

Figure 3:
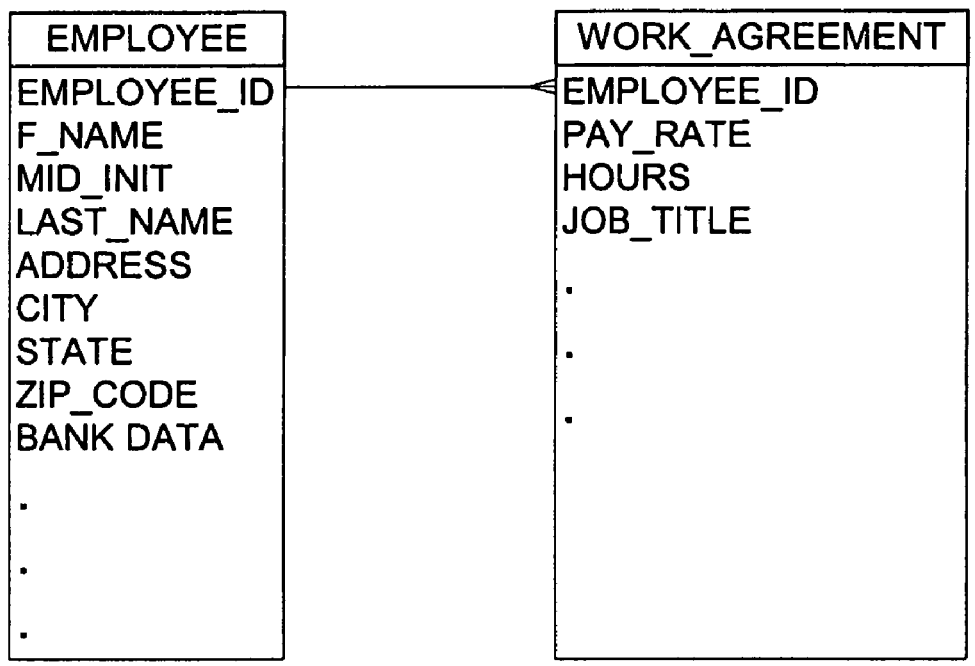
FIG. 3 is a data diagram of work agreement data separated from employee data according to an example embodiment.

FIG. 3 is a data diagram 300 of work agreement data separated from employee data according to an example embodiment. The data diagram 300 includes an EMPLOYEE data structure having records with columns and a WORK_AGREEMENT data structure having records with columns.

The EMPLOYEE data structure, in some embodiments, includes columns:
EMPLOYEE_ID
F_NAME
MID_INIT
LAST_NAME
ADDRESS
CITY
STATE
ZIP_CODE
BANK_DATA (for payroll direct deposit)
other data descriptive of the employee as an individual as needed depending on the specific embodiment.

The WORK_AGREEMENT data structure, in some embodiments, includes columns:
EMPLOYEE_ID
PAY_RATE
HOURS
JOB_TITLE
Other data descriptive of an employee agreement to perform work as needed depending on the specific embodiment.

Figure 4:
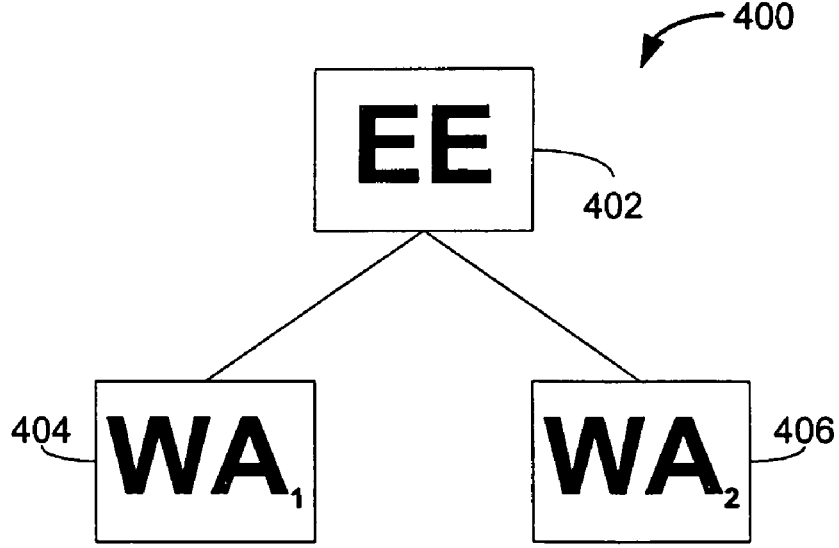
FIG. 4 is an object diagram according to an example embodiment.

In the illustrated embodiment, an EMPLOYEE record can be associated with one to many WORK_AGREEMENT records. This allows an employee, such as a teacher, to have more than one work agreement. In the teacher scenario, the teacher can have a school year WORK_AGREEMENT record defining an agreement to teach during the school year. The teach can also have other WORK_AGREEMENT records that define one or more other agreements to teach at other times, such as a summer term, after school, winter term, or an agreement for each semester. FIG. 4 provides an illustration of objects in a system, such as the system 200 of FIG. 2, to facilitate instances where there are multiple work agreements.

FIG. 4 is an object diagram 400 according to an example embodiment. The object diagram 400 includes an employee object EE 402 related to a first work agreement object $WA_1$ 404 and a second work agreement object $WA_2$ 406.

In some such embodiments, the employee object 402 maintains employee data, such as data from the EMPLOYEE data structure of FIG. 3. The work agreement objects $WA_1$ 404 and WA$_2$ 406 each maintain data such as WORK_AGREEMENT record of the WORK_AGREEMENT data structure of FIG. 3. The work agreement objects WA$_1$ 404 and WA$_2$ 406 are associated with the employee object EE 402 according to the data maintained by the objects.

Figure 5:
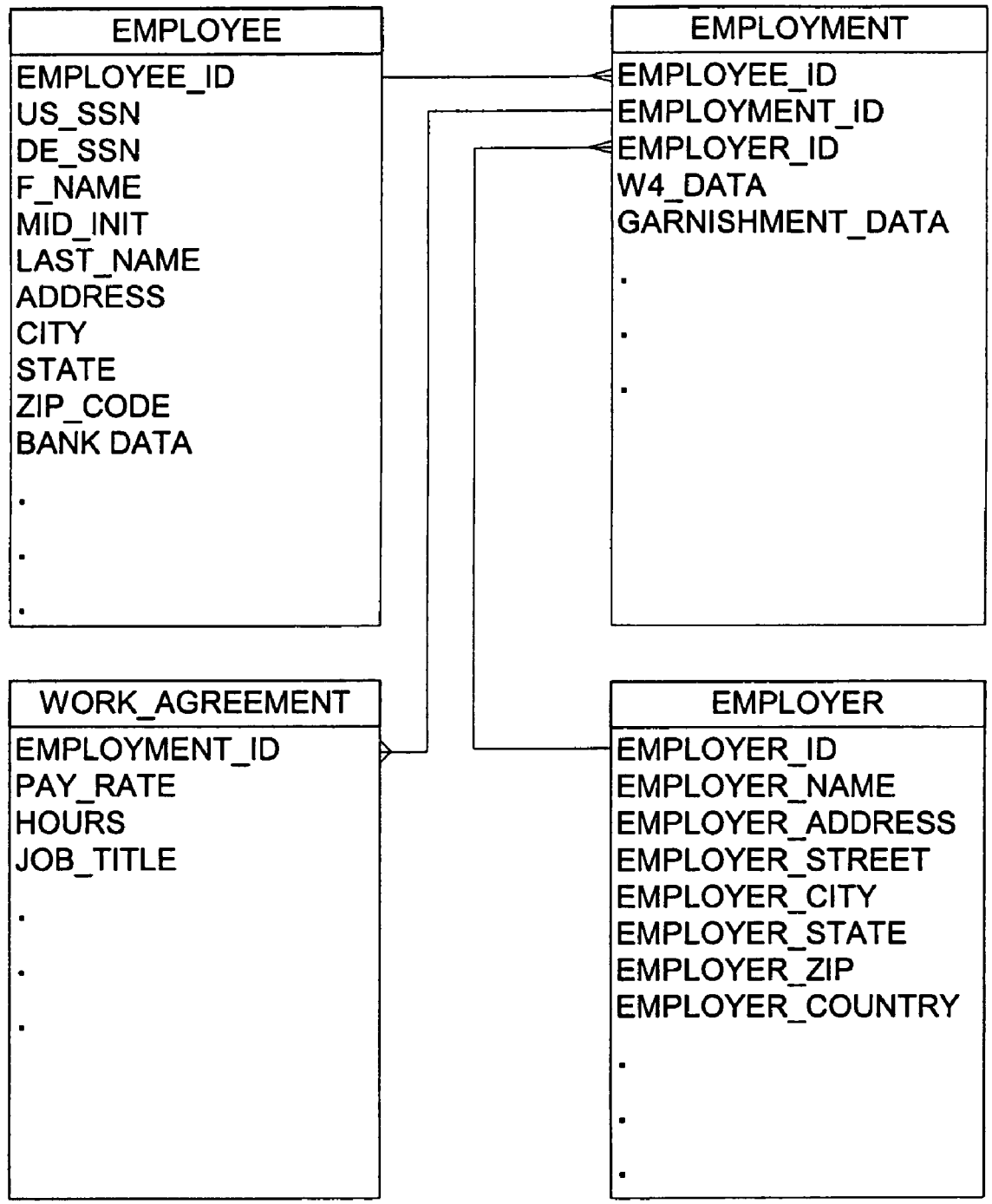
FIG. 5 is a data diagram of employment data linking employee data to work agreement and employer data according to an example embodiment.

FIG. 5 is a data diagram 500 of employment data linking employee data to work agreement and employer data according to an example embodiment. Some such example embodiments are useful to provide the ability of a single employee to have one or more work agreements with more than one employer. In such instances, the more than one employer can be a subsidiary of a parent company, foreign entities of a parent entity, or even completely different companies employing the same employee, where the different companies serviced by a common personnel administration company.

The data diagram includes an EMPLOYEE data structure as described above with regard to FIG. 3. The data diagram further includes an EMPLOYMENT data structure having records with columns, a WORK_AGREEMENT data structure having records with columns, and an EMPLOYER data structure having records with columns.

The EMPLOYMENT data structure, in some embodiments, includes columns:
EMPLOYEE_ID
EMPLOYMENT_ID
W4_DATA
GARNISHMENT_DATA
Other data descriptive of an employee employment, or relevant thereto, as needed depending on the specific embodiment.

The WORK_AGREEMENT data structure, in some embodiments, includes columns:
EMPLOYMENT_ID
PAY_RATE
HOURS
JOB_TITLE
Other data descriptive of an employee agreement to perform work as needed depending on the specific embodiment.

The EMPLOYER data structure, in some embodiments, includes columns:
EMPLOYER_ID
EMPLOYER_NAME
EMPLOYER_ADDRESS
EMPLOYER_STREET
EMPLOYER_CITY
EMPLOYER_STATE
EMPLOYER_ZIP
EMPLOYER_COUNTRY
Other data descriptive of an employer as needed depending on the specific embodiment.

In the illustrated embodiment, an EMPLOYEE record can be associated with one to many EMPLOYMENT records with the EMPLOYEE_ID to facilitate an employee having employment with more than one employer. One to many WORK_AGREEMENT records can be associated with an EMPLOYMENT record with the EMPLOYMENT_ID to facilitate a single employee having multiple work agreements with a single employer. One EMPLOYER record can be associated with one to many EMPLOYMENT records to facilitate an employer employing one or more employees, wherein each employee can have one or more work agreements with each employer.

Figure 6:
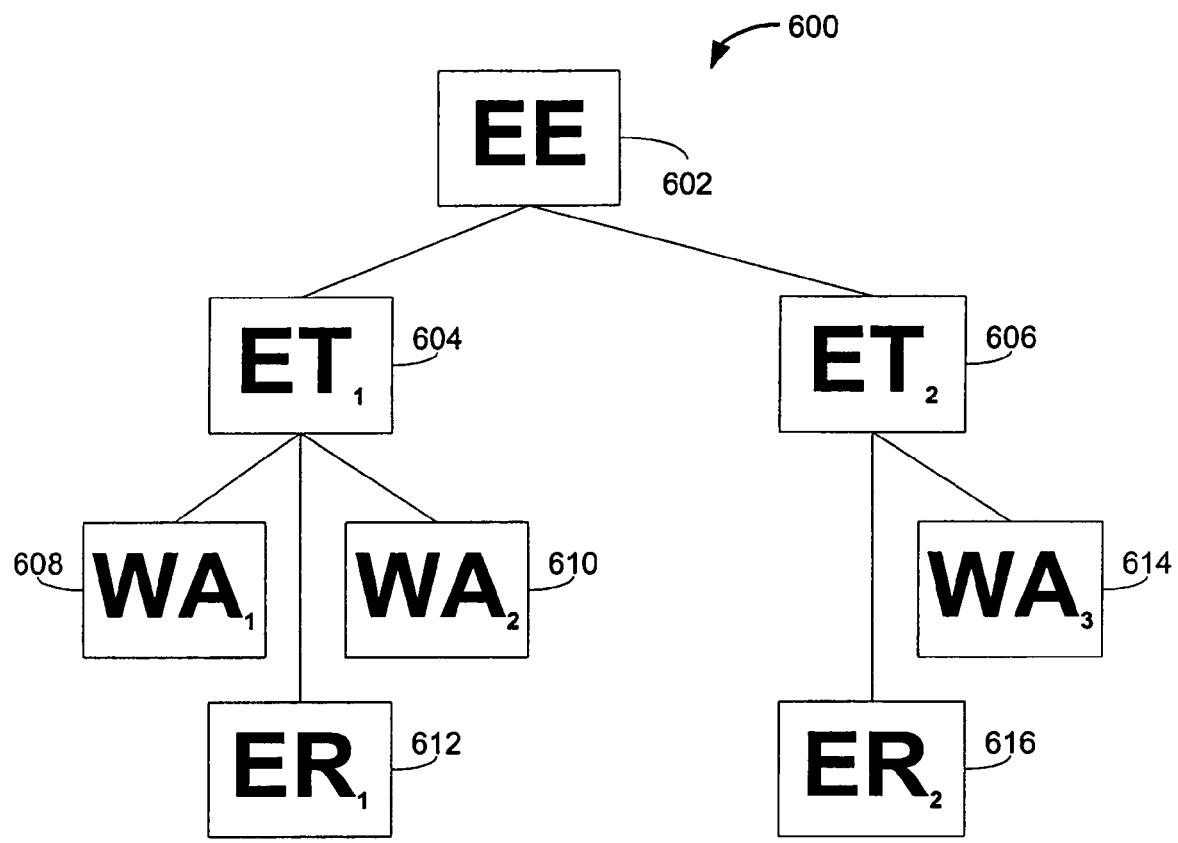
FIG. 6 is an object diagram according to an example embodiment.

FIG. 6 is an object diagram 600 according to an example embodiment. The objects of the object diagram 600 provide an object embodiment of the example embodiment illustrated in the data diagram 500 of FIG. 5 and provide similar abilities.

The object diagram 600 includes an employee object EE 602 related to a first employment object ET 604$_1$ and a second employment object ET$_2$ 606. The first employment object ET 604$_1$ is related to a first work agreement object WA$_1$ 608, a second work agreement object WA$_2$ 610, and a first employer object ER$_1$ 612. The second employment object ET$_2$ 606 is related to a third work agreement object WA$_3$ 614 and a second employer object ER$_2$ 616.

In such embodiments, the employee object EE 602 maintains employee data, such as data from the EMPLOYEE data structure of FIG. 5. The employment objects ET$_1$ 604 and ET$_2$ 606 maintain data, such as data from the EMPLOYMENT data structure of FIG. 5, wherein each employment object ET$_1$ 604 and ET$_2$ 606 is representative of an individual EMPLOYMENT record. The work agreement objects WA$_1$ 608, WA$_2$ 610, and WA$_3$ 614 maintain data, such as individual WORK_AGREEMENT records of the WORK_AGREEMENT data structure of FIG. 5. The employer objects ER$_1$ 612 and ER$_2$ 616 maintain data, such as individual EMPLOYER records from the EMPLOYER data structure of FIG. 5.

In some embodiments, the employer of the first employer object ER$_1$ 612 represents a United States subsidiary of a parent corporation and the second employer object ER$_2$ 616 represents a German subsidiary of the parent corporation. The first employment object ET$_1$ 604 includes United States W4 tax withholding data of the employee represented by the employee object EE 602. The second employment object ET$_2$ 606 includes German tax withholding data of the employee represented by the employee object EE 602. Thus, when a payroll process executes, the payroll process can determine all United States withholdings for the employee for the first and second work agreements WA$_1$ 608 and WA$_2$ 610 based at least in part on the W4 tax withholding data in the first employment object ET$_1$ 604. Similarly, the payroll process can determine all German withholding for the employee for the third work agreement WA$_3$ 614 based at least in part on the withholding data in the second employment object ET$_2$ 606.

Figure 7:
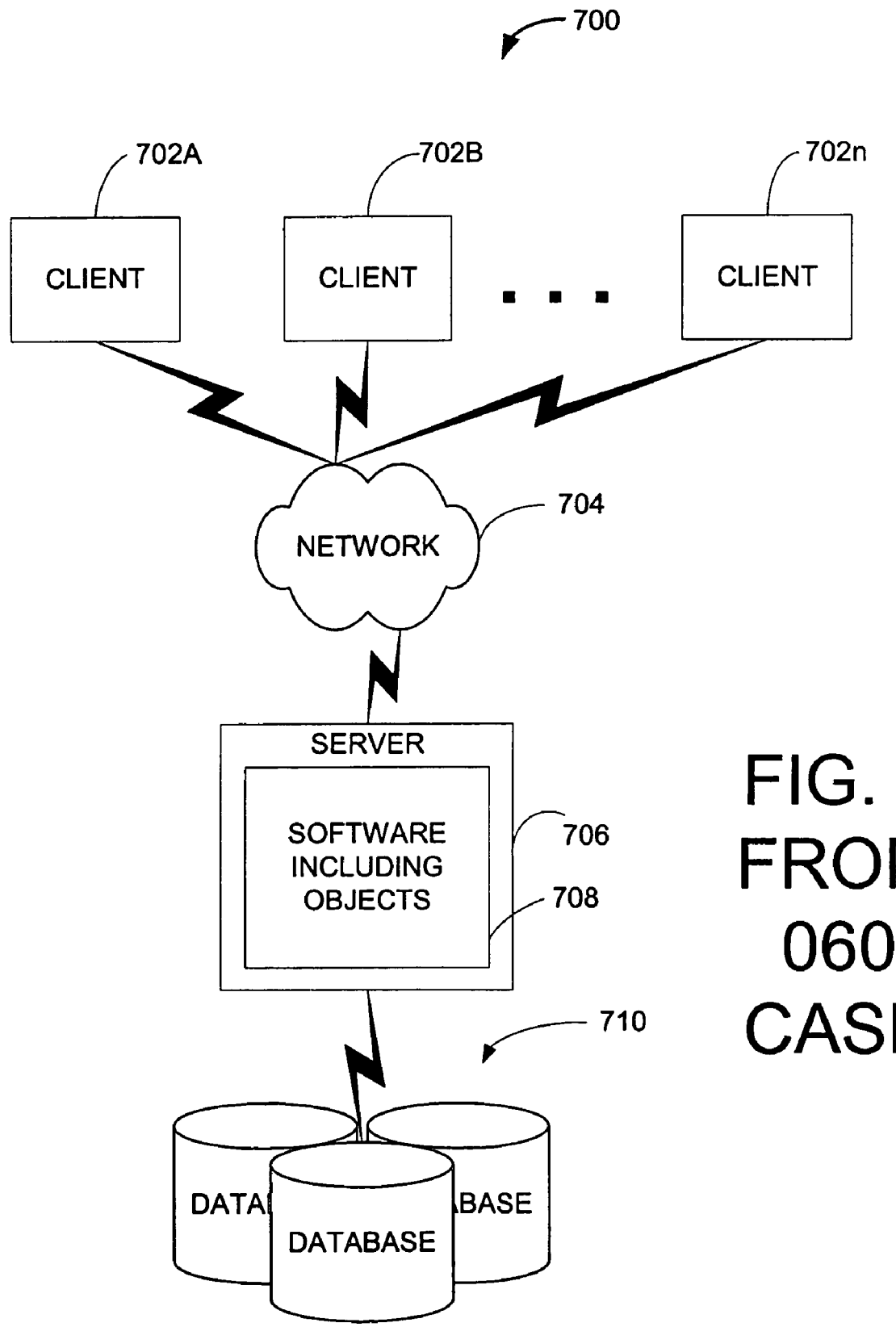
FIG. 7 is a schematic block diagram of a system according to an example embodiment.

FIG. 7 is a schematic block diagram of a system 700 according to an example embodiment. The system 700 includes a plurality of clients 702A, 702B, and 702n, where "n" is a total number of the plurality of clients. The system 700 further includes a server 706 operatively interconnected to the clients 702A, 702B, 702n via a network 704. The server is further operatively connected to one or more databases 710 via a link, such as a storage area network, a local area network, or via a bus internal to the server. In such embodiments, the storage area network, in some embodiments is also interconnected to the network 704.

The server 706, in the illustrated example system 700, has software 708 including applications, such as the applications 202, 208, 212, 216, 222, and 226 of FIG. 2 and described above. The software 708 further includes objects, such as objects EE 204, BE 206, TX 210, GR 214, WA 218, and S 224 also of FIG. 2 and described above.

In some embodiments, the server 706 includes one or more servers 706 arranged on the network for one or more of various purposes. Some such purposes include load balancing, servers 706 dedicated to perform specific functions or execute certain applications, perform web server or application server duties, and other purposes depending on the specific embodiment.

In some embodiments, the databases 710 include one or more data storage mechanisms. Some such mechanisms can include relational databases, hierarchical databases, file stores, and other data storage mechanisms as needed based on the specific embodiment.

Figure 8:
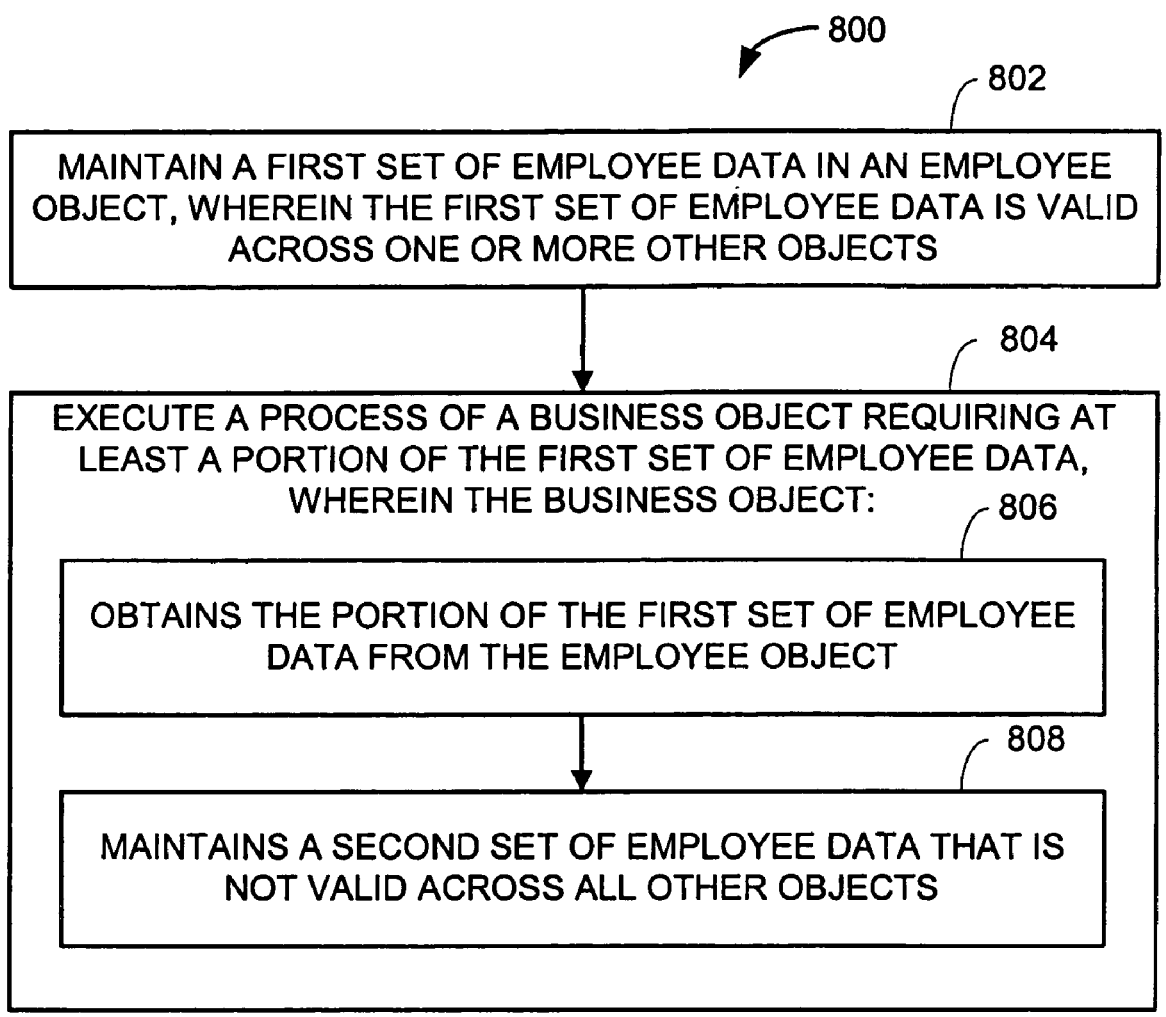
FIG. 8 is a flow diagram of a method according to an example embodiment.

FIG. 8 is a flow diagram of a method 800 according to an example embodiment. Some embodiments of the method 800 include maintaining a first set of employee data in an employee object 802, wherein the first set of employee data is valid across one or more other objects and executing a process of a business object requiring at least a portion of the first set of employee data 804.

In some embodiments, the business object, such as one or more of the objects BE 206, TX 210, GR 214, WA 218, and S 224 of FIG. 2, obtains the portion of the first set of employee data from the employee object 806, such as employee object 204 of FIG. 2. In some such embodiments, the business object also maintains a second set of employee data that is not valid across all other objects 808.

FIG. 9 is a flow diagram of a method 900 according to an example embodiment. In some embodiments, the method 900 includes maintaining a first set of employee data in an employee object including an employee record for each employee 902 and maintaining a second set of employee data in a work agreement object in work agreement records, wherein one or more work agreement records are relationally associated with each employee record 904.

In some embodiments, a work agreement record includes a pay rate. In some further embodiments, the work agreement record includes a reference to a template work agreement and data to complete the template work agreement. A work agreement record can also identify an effective period for the work agreement represented by the work agreement record.

FIG. 10 is a flow diagram of a method 1000 according to an example embodiment. Some embodiments of the method 1000 include maintaining a first set of employee data in an employee object including an employee record for each employee, wherein the first set of employee data is valid across one or more other objects 1002 and maintaining a second set of employee data in an employment object in employment records 1004. In some embodiments, each employment record is relationally associated to single employee record 1006 and the second set of employee data is valid across one or more, but not all, other objects 1008.

Some further embodiments of the method 1000 include maintaining a third set of employee data in a work agreement object in work agreement records, wherein work agreement records define one or more work agreements per employment record.

Yet further embodiments of the method 1000 include maintaining a fourth set of employee data in an employer object in employer records. In some such embodiments, each employer record relationally associates an employer with an employment record and each employment record relationally associates one or more work agreement records with an employer record.

Additional embodiments of the method 1000 include maintaining a fourth set of employee data in an employer object in employer records, wherein each employer record relationally associates an employer with one or more employee records via employment records.

In some embodiments of the method 1000, a process executes as a function of an employer record to obtain an employee salary report. This process identifies all employment records associated with an employer, retrieves at least a portion of each employee record associated with the identified employment records, and retrieves at least a portion of each work agreement record associated with each employment record.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

What is claimed is:

1. A computerized method for performing personnel administration tasks, comprising:

accessing a first set of employee data in a first object in a first application executed by a server, wherein the first set of employee data is relevant for at least one of a plurality of other objects, wherein the first object is an employee object, and wherein each of the plurality of other objects maintain data relevant for a personnel administration task and the plurality of other objects include a benefits object, a tax object, a garnishment object, a work agreement object, and an organizational management object;

using the first set of employee data to access a second set of employee data in one of the plurality of other objects, wherein the second set of employee data is correspondingly relevant for a second application also executed by the server; and performing the personnel administration task using the second set of employee data in the second application.

2. The method of claim 1, wherein the first application is a personnel administration application.

3. The method of claim 1, wherein: the first set of employee data includes employee records having columns, and the columns include a name column, an address column, and a bank data column.

4. The method of claim 1, wherein the first object includes a plurality of methods to provide access to the first set of employee data to a plurality of applications executed by the server, the plurality of applications including the second application.

5. The method of claim 4, wherein the plurality of methods include:

a method to service queries to the first set of employee data from the plurality of applications executed by the server; and a method to service update requests for the first set of employee data.

6. The method of claim 1, wherein the first object has exclusive access to the first set of employee data.

7. A system comprising:
- a server to execute a plurality of applications, wherein the plurality of applications is stored on a memory on the server and the applications send instructions to a processor on the server;
- a first object of a first application executed by the server to provide a first set of employee data stored on the memory to the first application responsive to receiving instructions for the first set of employee data from the processor, wherein the first object is an employee object of the first application; and
- a second application executed on the server to provide a second set of employee data responsive to receiving the first set of employee data from the first application, wherein the second set of employee data is one of a plurality of other objects of the second application, the plurality of other objects including a benefits object, a tax object, a garnishment object, a work agreement object, and an organizational management object.

8. The system of claim 7, wherein the first application is a personnel administration application.

9. The system of claim 7, wherein: the first set of employee data includes employee records having columns, and the columns include a name column, an address column, and a bank data column.

10. The system of claim 7, wherein the first object includes a plurality of methods to provide access to the first set of employee data to a plurality of applications executed by the server, the plurality of applications including the second application.

11. The system of claim 10, wherein the plurality of methods include:
- a method to service queries to the first set of employee data from the plurality of applications executed by the server; and
- a method to service update requests for the first set of employee data.

12. A machine-readable storage device having a data structure stored thereon to represent at least one employer employing at least one employee according to at least one work agreement with each employer, the data structure comprising:
- an employee record; and
- a plurality of employment records associated with a corresponding plurality of work agreement records, wherein at least some of the plurality of employment records are associated with a corresponding plurality of work agreement records, wherein the employee record is valid across each of the plurality of employment records and wherein each of the plurality of employment records is not valid across all other employment records and their corresponding work agreements, wherein the data of an employee record is further associated with at least one of a plurality of other records, the plurality of other records including a benefits record, a tax record, a garnishment records, and an organizational management record.

13. The machine-readable storage device of claim 12, wherein each of the plurality of employment records comprise a plurality of columns to hold data, wherein the plurality of columns include:
- an employee identification column to identify the employee record valid across each of the plurality of employment records;
- an employment identification column to identify the employment record; and a garnishment column to hold garnishment data.

14. The machine-readable storage device of claim 12, wherein each of the plurality of work agreement records comprises a plurality of columns and the plurality of columns include:
- an employment identification column to identify the employment record associated with the work agreement record; and
- a pay rate column to hold pay rate data for the employment record the work agreement is associated to;
- an hours column to hold work hours data for the employment record the work agreement record is associated to; and
- a job title column to hold job title data for the employee record valid for the employment record the work agreement record is associated to.

15. The machine-readable storage device of claim 12, wherein each employer comprises a plurality of columns, wherein the columns include:
- an employer identification column to identify the employer with the plurality of employee records;
- an employer name column to identify the name of the employer; and
- an employer address column to identify the address of the employer.

* * * * *